United States Patent [19]
Tsuboi et al.

[11] Patent Number: 6,043,945
[45] Date of Patent: Mar. 28, 2000

[54] RECORDING/REPRODUCING DEVICE AND METHOD OF REPLACING DEFECTIVE SECTOR ON MEDIA

[75] Inventors: Takehiko Tsuboi; Koji Ikenoya; Tomoo Furukawa, all of Kawasaki; Toshihiko Matsuda, Higashine; Koji Ishii, Higashine; Hiroyuki Kobayashi, Higashine; Yukio Abe, Higashine, all of Japan

[73] Assignee: Fujitsu Limited, Kawasaki, Japan

[21] Appl. No.: 08/935,520

[22] Filed: Sep. 23, 1997

Related U.S. Application Data

[63] Continuation of application No. 08/531,566, Sep. 18, 1995, abandoned.

[30] Foreign Application Priority Data

Dec. 21, 1994 [JP] Japan .................................. 6-318586

[51] Int. Cl.$^7$ .............................. G11D 5/09; G06F 11/00; G11C 29/00
[52] U.S. Cl. ................................ 360/53; 360/47; 371/5.1; 371/10.2
[58] Field of Search ......................... 360/53, 47; 369/47, 369/48, 53, 54, 57, 58; 324/228, 235; 371/3, 5.1, 10.2

[56] References Cited

U.S. PATENT DOCUMENTS

| | | | |
|---|---|---|---|
| 4,942,609 | 7/1990 | Meyer | 360/31 |
| 5,088,081 | 2/1992 | Farr | 360/47 |
| 5,216,655 | 6/1993 | Hearn et al. | 369/58 |
| 5,237,553 | 8/1993 | Fukushima et al. | 369/47 |
| 5,255,270 | 10/1993 | Yanai et al. | 360/53 |
| 5,515,500 | 5/1996 | Mizuno et al. | 714/710 |
| 5,517,111 | 5/1996 | Shelor | 324/235 |
| 5,532,992 | 7/1996 | Funamoto | 369/47 |
| 5,563,746 | 10/1996 | Bliss | 360/53 |
| 5,600,500 | 2/1997 | Madsen et al. | 360/53 |

FOREIGN PATENT DOCUMENTS

| | | |
|---|---|---|
| 62212977 | 9/1987 | Japan . |
| 1112574 | 5/1989 | Japan . |
| 2 7272 | 1/1990 | Japan . |
| 2179969 | 7/1990 | Japan . |
| 4106744 | 4/1992 | Japan . |
| 5128735 | 5/1993 | Japan . |
| 5135502 | 6/1993 | Japan . |
| 5205411 | 8/1993 | Japan . |

*Primary Examiner*—Aristotelis M. Psitos
*Assistant Examiner*—Regina Y. Neal
*Attorney, Agent, or Firm*—Greer, Burns & Crain, Ltd.

[57] ABSTRACT

A device for recording and reproducing data on a recording media includes an error detecting unit for detecting a defective sector by reading the data from the media, a data copying unit for copying the data of the defective sector to at least one temporary replacing sector, a test unit for testing whether the defective sector has a media defect, and a replacement unit for replacing the defective sector with a spare sector by copying the data of the at least one temporary replacing sector to the spare sector when the defective sector has the media defect.

14 Claims, 16 Drawing Sheets

1

RECORDING/REPRODUCING DEVICE AND METHOD OF REPLACING DEFECTIVE SECTOR ON MEDIA

This application is a continuation of application Ser. No. 08/531,566 filed on Sep. 18, 1995, now abandoned.

BACKGROUND OF THE INVENTION

1. Field of the Invention

The present invention generally relates to recording/reproducing devices, and particularly relates to a recording/reproducing device which replaces a defective sector on a recording media.

In recent years, there has been a demand for lowering the costs and increasing the volume of recording/reproducing devices. In the recording/reproducing devices, a test for a recording media is conducted to ensure reliability of the devices. If defective sectors are found on the recording media during the test, these sectors are replaced by other sectors. Since the number of defective sectors increases with an increase in the total number of sectors, it takes a longer time for testing devices having a larger volume. Thus, there is a need for a method of shortening the test time without compromising the reliability of the devices.

2. Description of the Prior Art

In the magnetic disk drive of the prior art, an analog examination was the main type of tests for the recording media, in which read signal patterns from the media are inspected to detect portions of excessively large magnitudes or excessively small magnitudes. These portions are then identified as defective sectors. However, lower costs and mass-scale manufacturing of the devices has resulted in digital tests being the majority of the media tests. Digital tests are conducted by writing data and detecting errors to identify the defective sectors.

Regardless of the type of tests, i.e., digital tests or analog tests, the number of defective sectors increases with an increase in the total number of sectors, which leads to a longer test time and increased manufacturing costs.

Tests which require less time include tests based on automatic replacement processing and verification processing. The automatic replacement processing searches for the defective sectors during the formatting of a disk, and these defective sectors are replaced by spare sectors automatically. The verification processing checks if a given sector is defective by reading data from the sector immediately after the data is written in the sector.

There is another method in which ECC (error correction code) and offset-read are used for recovering data for a disk in combination with the use of the automatic replacement processing. In this method, if defective sectors are generated and data cannot be recovered, then, these sectors are replaced to enhance the reliability.

FIG. 1 shows an illustrative drawing for explaining the replacement of the sectors. FIG. 1 shows sectors 0 to 12 arranged on one track. If LBA (logical block address) 6 is detected as a defect, for example, one of the spare sectors replaces the defective sector and becomes a new sector 6.

FIG. 2 shows a testing method of the prior art. FIG. 2 is concerned with the treatment of small defects in magnetic disk devices. At a step S101, defective sectors are detected during the formatting of a disk, and unrecoverable defective sectors are automatically replaced. At a step S102, long-hour running which lasts for several hours per one surface of the disk is conducted. During the long-hour running, a functionality test and a reliability check are conducted by using an ECC function and a format/certify function, and, also, small defects are detected and replaced. At a step S103, the device is shipped out from a factory. This test tries to minimize the number of small defects.

As described earlier, the automatic replacement function automatically replaces sectors generating read errors with spare sectors. However, read errors can be generated by causes other than media damages so that some sectors with read errors do not have to be necessarily replaced. Examples of such read errors are errors which occur in a large number with small repeatability under bad conditions, including errors occurring due to external noise (electromagnetic fields), vibrations, mechanical off-track, peculiarity of head materials, electromagnetic conversion characteristics, etc.

Even if a given sector has errors of high repeatability, the sector might not have media damage. For example, such errors include an error caused by off-track writing which results from an impact applied during the writing of data. Another example of such errors is an error caused by debris of data which is left when the writing of data is terminated because of power-cut and the like.

When sectors having no media defect are replaced by spare sectors, the number of used spare sectors increases so as to fill the spare sector area. This leads to a shorter life and a lower performance of the devices. Also, when the number of rewrites is limited in a given media, blocks whose rewrite numbers have already exceeded a limit might be used for replacing blocks after the formatting of a disk. This leads to lower reliability of the device.

There are several methods proposed for countering these problems. Such methods are, for example, disclosed in Japanese Laid-Open Patent No. 5-135502 and No. 4-106764. Japanese Laid-Open Patent No. 5-135502 teaches providing two pointers indicating replacing blocks for a media with a limited number of rewrites. When replacement is provided by using the first pointer, the process of the replacement is completed. In doing so, the reliability of the media is enhanced by avoiding the use of blocks exceeding a rewrite limit.

Japanese Laid-Open Patent No. 4-106764 teaches replacing defective bytes and several other bytes in the proximity thereof. That is, an effective use of the spare area is realized by replacing only a defective portion of a sector and a few adjacent bytes instead of the whole sector.

Also, other methods have been proposed to counter a problem that errors occur first time at the time of writing data in an unused space which has not been accessed by the host device. Other methods have been proposed to enhance detectability of defects.

However, the techniques disclosed in these two patent applications described above have a problem in that user data is lost when the replacement process is terminated by a power-cut, a reset or other reasons.

In a small magnetic drive using a magnetic disk smaller than 3.5 inches, an MPU (micro processor) of the drive tends to have a limited performance. Thus, when the automatic replacement function is incorporated in such a device, this limited performance leads to a longer processing time. Also, when a host device connected to the magnetic drive has a limited performance, time out may be detected during the replacement process.

Also, when the environment for using the device is not stable and the device is easily influenced by noise, vibration, temperature changes, etc., a replacement process solely dependent on the detection of read errors may lead to the use of all the spare sectors. Thus, the life of the device is shortened, and the reliability is compromised.

Accordingly, there is a need in the field of recording/reproducing devices for a recording/reproducing device and a method of replacing defective sectors which can shorten the time required for replacing defects and can enhance the reliability.

SUMMARY OF THE INVENTION

Accordingly, it is a general object of the present invention to provide a recording/reproducing device and a method of replacing defective sectors which can satisfy the need described above.

Also, it is another and more specific object of the present invention to provide a recording/reproducing device and a method of replacing defective sectors which can shorten the time required for replacing defects and can enhance the reliability.

In order to achieve the above objects according to the present invention, a device for recording and reproducing data for a media includes an error detecting unit for detecting a defective sector by reading the data from the media, a data copying unit for copying the data of the defective sector to at least one temporary replacing sector, a test unit for testing whether the defective sector has a media defect, and a replacement unit for replacing the defective sector with a spare sector by copying the data of the at least one temporary replacing sector to the spare sector when the defective sector has the media defect.

The same objects can be achieved according to the present invention by a method of replacing a defective sector with a spare sector on a media in which data is recorded or reproduced. The method includes the steps of a) detecting the defective sector by reading the data from the media, b) copying the data of the defective sector to at least one temporary replacing sector, c) testing, after step b), whether the defective sector has a media defect, and d) replacing the defective sector with the spare sector by copying the data of the at least one temporary replacing sector to the spare sector when the defective sector has the media defect.

According to the present invention, after the defective sectors are detected, data of the defective sectors is copied to the temporary replacing sectors. Then, the defective sectors are checked to determine if they are really defective. When defectiveness of the defective sectors is confirmed, data in the temporary replacing sectors is copied to spare sectors. Thus, the present invention provides an effective field test, which enables the test time to be shortened. Also, since the inappropriate replacement of sectors is prevented, reductions in the life and performance of the device are prevented. Furthermore, loss of data during the replacement process can be prevented because the data is copied to the temporary replacing sectors. These factors add up to an enhanced reliability of the device.

Other objects and further features of the present invention will be apparent from the following detailed description when read in conjunction with the accompanying drawings.

DESCRIPTION OF THE PREFERRED EMBODIMENTS

In the following, an embodiment of the present invention will be described with accompanying drawings.

Figure 1:
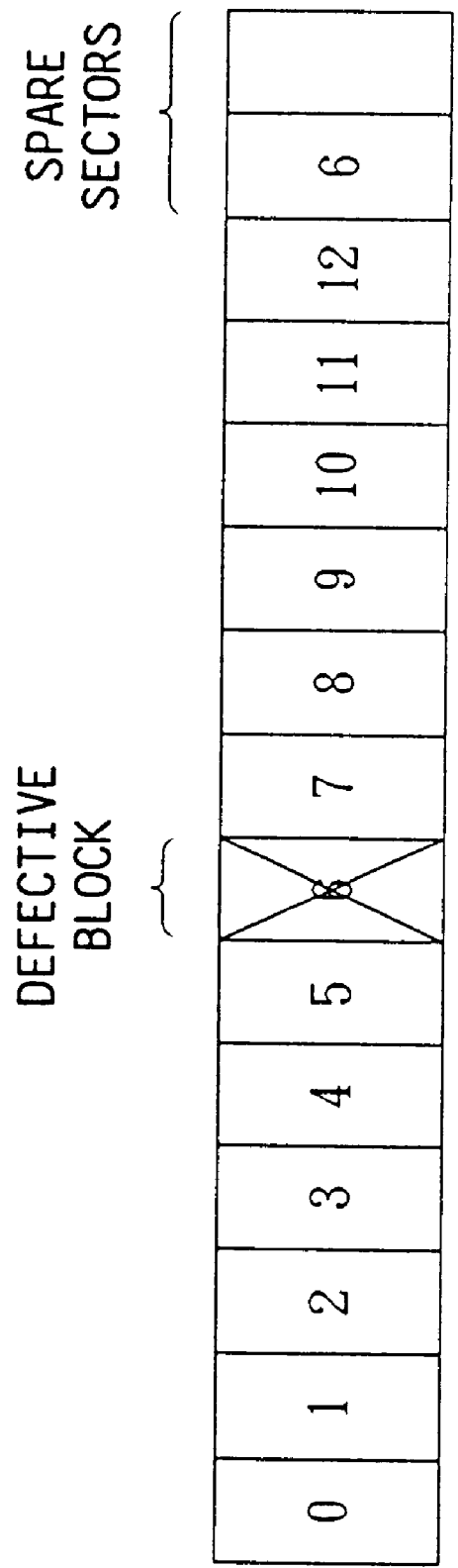
FIG. 1 is an illustrative drawing for explaining a replacement of a defective sector of the prior art.
Figure 2:
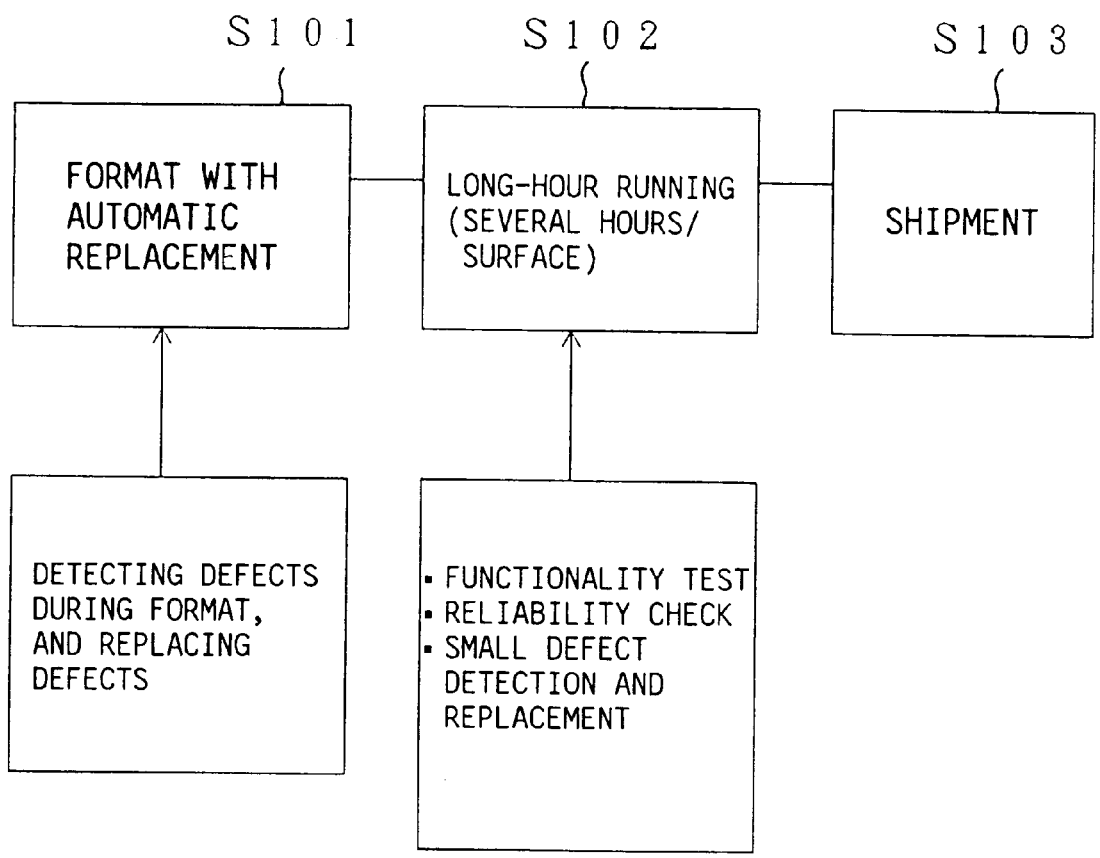
FIG. 2 is an illustrative drawing for explaining a prior-art method of replacing defective sectors.
Figure 3:
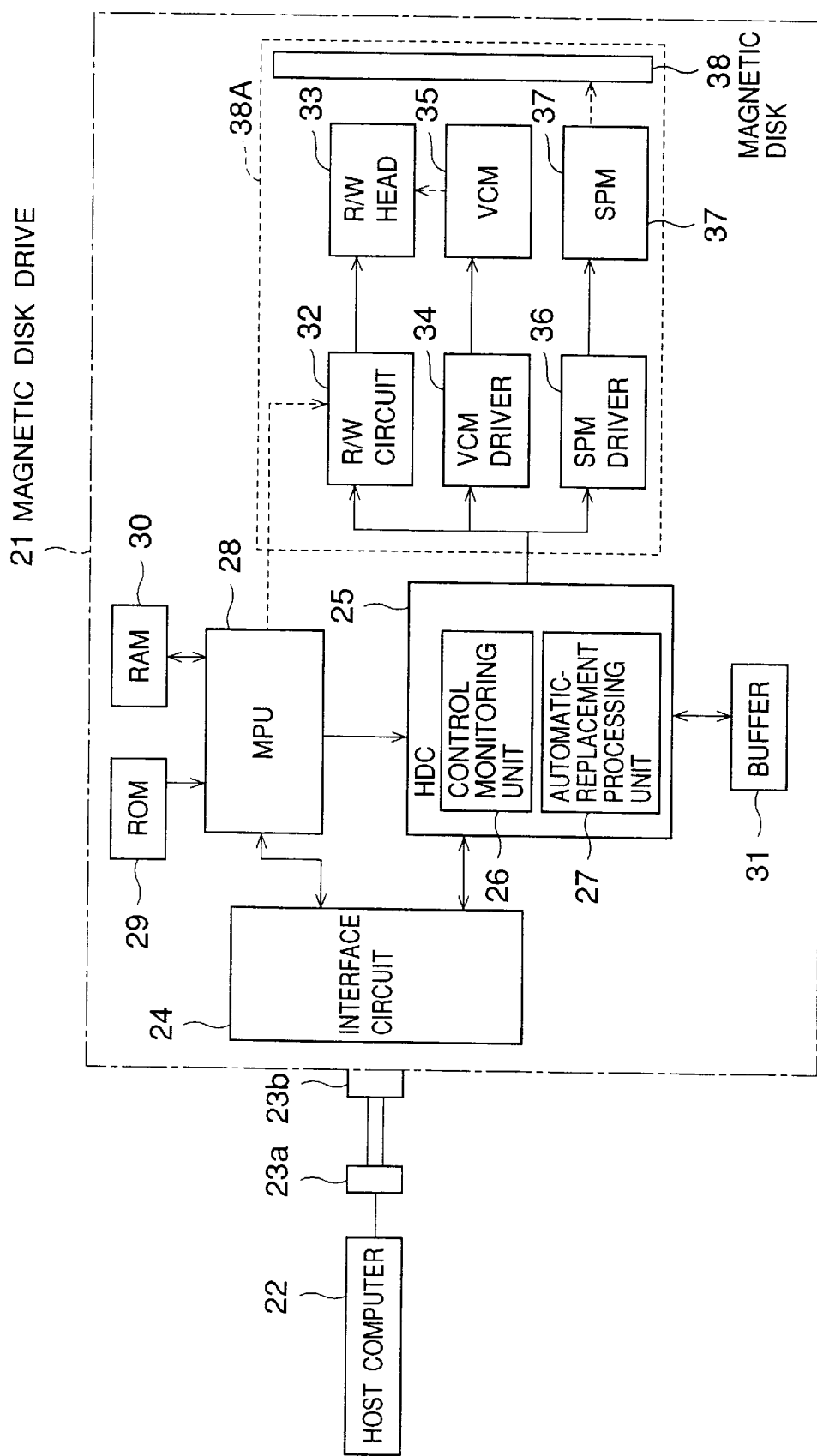
FIG. 3 is a block diagram of a magnetic disk drive according to an embodiment of the present invention.

FIG. 3 shows a block diagram of a magnetic disk drive, which is a recording/reproducing device according to an embodiment of the present invention. In FIG. 3, a magnetic disk drive 21 is connected to a host computer 22 through an interface device 23a and 23b such as SCSI devices.

The magnetic disk drive 21 includes an interface circuit 24 and a HDC (hard disk controller) 25 connected to each other. The HDC 25 includes a control monitoring unit 26 as a monitoring unit and an automatic-replacement processing unit 27. The HDC 25 receives user data and the like from the host computer 22 via the interface circuit 24.

An MPU 28 is connected to the interface circuit 24, ROM (read only memory) 29, RAM (random access memory) 30, and the HDC 25. The MPU 28 receives various instructions such as a read instruction, a write instruction, and the like from the host computer 22 via the interface circuit 24.

The HDC 25 is connected to a buffer 31, which temporarily stores the user data provided for the HDC 25. The user data is read out from the buffer 31 when the user data is written in a magnetic disk 38. The user data read out from the buffer 31 is supplied to a R/W (read/write) head 33 via a R/W circuit 32. The R/W circuit 32 includes a modulation circuit, a demodulation circuit, an A/D (analog to digital) converting circuit, and a D/A (digital to analog) converting circuit (not shown). The R/W circuit 32 receives a write gate signal and a read gate signal from the MPU 28.

The HDC 25 drives a VCM (voice coil motor) 35 via a VCM driver 34. The VCM 35 moves the R/W head 33 in a radial direction of the magnetic disk 38.

Also, the HDC 25 drives a SPM (spindle motor) 37 via a SPM driver 36. The SPM 37 rotates the magnetic disk 38, which is a recording media, at a constant rate.

The R/W circuit 32, the R/W head 33, the VCM driver 34, the VCM 35, the SPM driver 36, the SPM 37, and the magnetic disk 38 are collectively referred as a disk mechanism 38A hereinafter.

Figure 4:
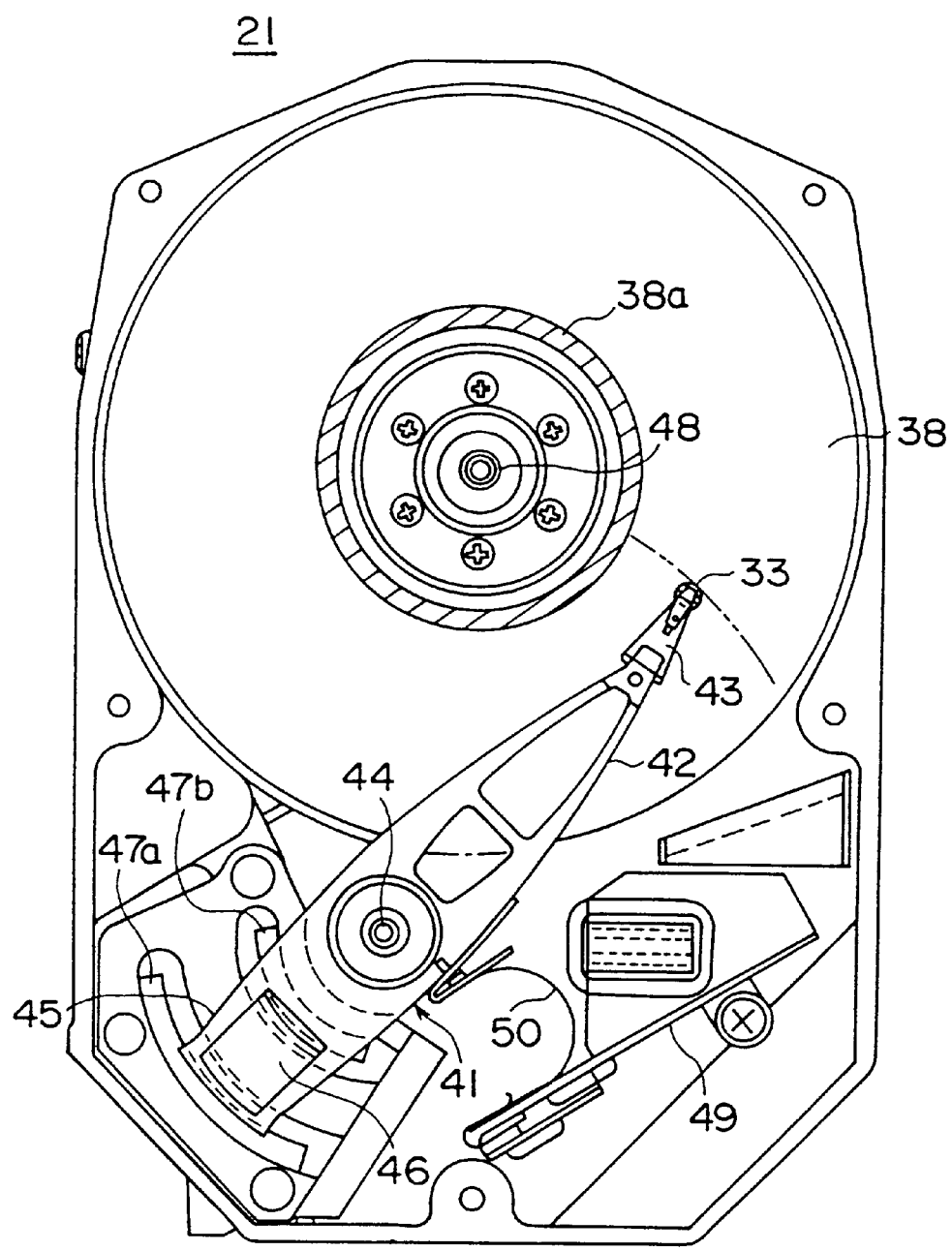
FIG. 4 is a plan view of the magnetic disk drive of FIG. 3.

FIG. 4 shows a plan view of the inside of the magnetic disk drive 21. In FIG. 4, an arm 42 of an actuator 41 supports the R/W head 33 through a supporting spring mechanism 43. The arm 42 is movably mounted on a pivot 44, and can rotate around the pivot 44.

At an end of the arm 42 opposite the side of the R/W head 33, a rotation supporting unit 45 is formed. The rotation supporting unit 45 is provided with a coil 46 wrapped around the rotation supporting unit 45. Under the coil 46, magnets 47a and 47b are provided. The coil 46 and the magnets 47a and 47b constitute the VCM 35 of FIG. 3.

The magnetic disk 38 is rotated around a spindle 48 by the spindle motor 37 (not shown in FIG. 4), which is a sensor-less type. Power is supplied to the coil 46 from a printed board 49 via a flexible printed board 50. Thus, the arm 42 is rotated such that the R/W head 33 is moved in the radial direction of the magnetic head 33.

In the magnetic disk 38, a SA area (system area) 38a is provided in the innermost track. The SA area 38a contains a sequence table, temporary replacing sectors, and recording areas for other information, which will be described later.

Figure 5:
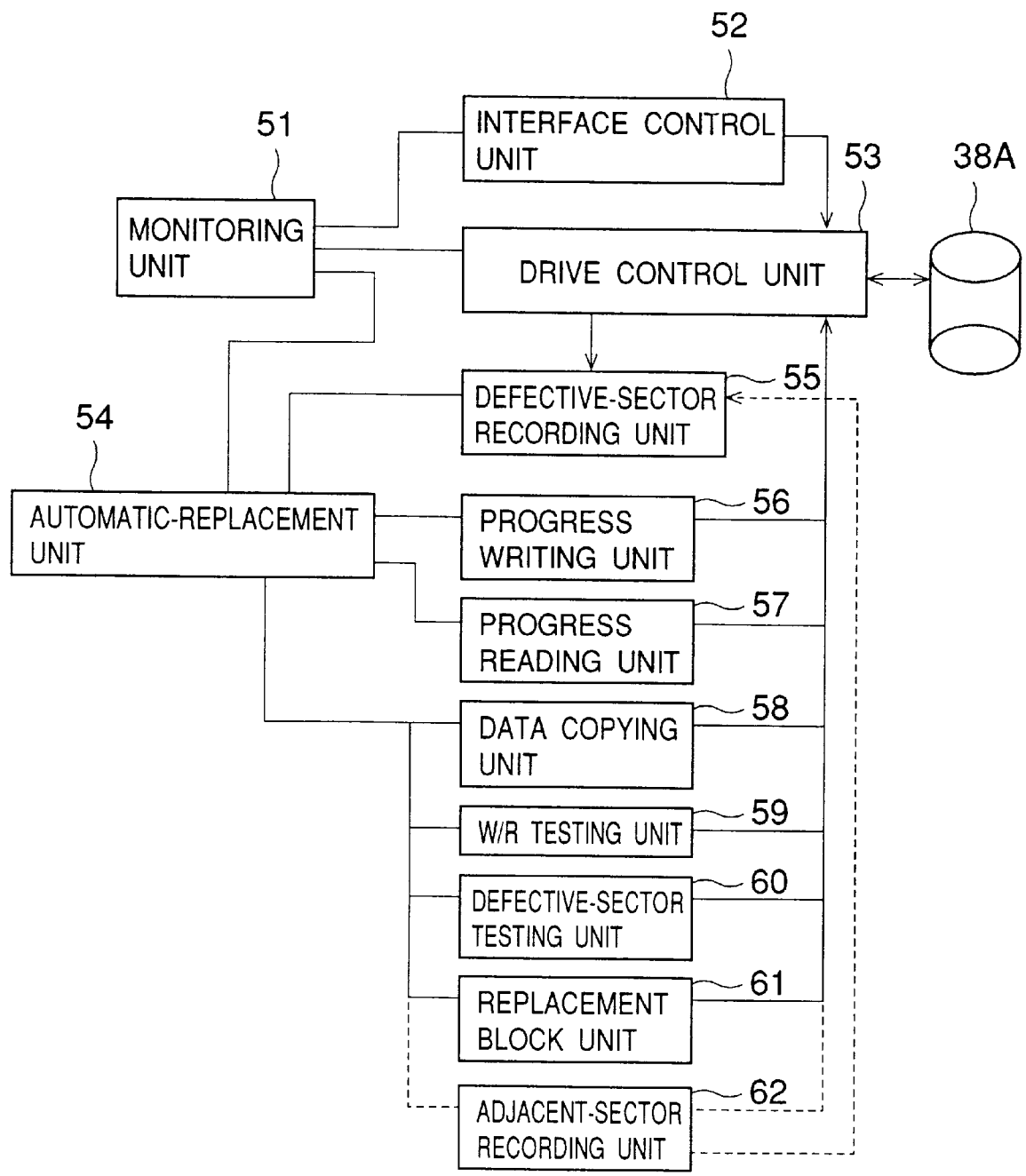
FIG. 5 is a block diagram of a control monitoring unit and an automatic-replacement processing unit of FIG. 3.

FIG. 5 shows a block diagram of the control monitoring unit 26 and the automatic-replacement processing unit 27 of FIG. 3.

In FIG. 5, the control monitoring unit 26 includes a monitoring unit 51, an interface control unit 52, and a drive control unit 53.

The monitoring unit 51 is a program monitor for monitoring the control of the interface control unit 52 and the drive control unit 53. Also, the monitoring unit 51 controls the automatic replacement process. Specifically, the monitoring unit 51 includes a timer monitoring function and a control management function.

The interface control unit 52 controls a host interface of the magnetic disk drive 21. The drive control unit 53 is connected to the disk mechanism 38A, and controls the writing and the reading of data for the magnetic disk 38. Also, the drive control unit 53 performs an offset-retry operation and an ECC correction upon detection of a read error.

The automatic-replacement processing unit 27 includes an automatic-replacement unit 54, a defective-sector recording unit 55, a progress writing unit 56, a progress reading unit 57, a data copying unit 58, a W/R testing unit 59, a defective-sector testing unit 60, a replacement block unit 61. As an alternative configuration, an adjacent-sector recording unit 62 may be included in the automatic-replacement processing unit 27 in addition to the above units.

The automatic-replacement unit 54 includes means for initial replacement processing, for replacement processing, and for process sequence control, and dictates a sequence of a replacement process. The defective-sector recording unit 55 identifies sectors for which the drive control unit 53 detects read errors, and stores these sectors in the SA area 38a of FIG. 4. The progress writing unit 56 records a progress of the replacement process in the SA area 38a. The same information about the progress is recorded in a plurality of blocks by considering a possible power-cut during the replacement process. Also, the progress recorded in these blocks has a time stamp at the start of the recorded data. The progress reading unit 57 reads the progress from the SA area 38a each time a step of the replacement process is started.

The data copying unit 58 copies data of defective sectors to temporary replacing sectors. In doing so, the data copying unit 58 checks whether the defective sectors registered in a R stack generate errors during the copying process, and performs a predetermined process based on a result of the check. This predetermined process will be described later. The W/R testing unit 59 is one of the testing means, and, also, a head testing means. The W/R testing unit 59 tests the entire circuit for reading data, and tests heads which have generated errors. This will be described later. The defective-sector testing unit 60 is one of the testing means, and, also, is a read-repeatability testing means as well as sector testing means. The defective-sector testing unit 60 checks whether the sectors having generated errors are really defective. This will be described later. The replacement-block unit 61 searches for available spare sectors. This also will be described later.

The adjacent-sector recording unit 62 calculates addresses of adjacent sectors neighboring the sectors judged as defective by the test. These adjacent sectors are located at the same positions as the defective sectors in adjoining tracks on both sides of the defective sectors. Then, the adjacent-sector recording unit 62 records these addresses in the SA area 38a of the magnetic disk 38. The adjacent sectors are tested at later time. It is highly likely that damages on the recording media exist across sectors, so that defective sectors are effectively searched by checking the adjacent sectors.

FIGS. 6A through 6D show block diagrams of the units which form the automatic-replacement processing unit 27. Here, the automatic replacement processing by these units is conducted before the shipment of the disk with regard to unrecoverable defective sectors, and small defects are treated after the shipment. In the case of treating the small defects, the automatic replacement processing is conducted when the number of defective sectors recorded in the R stack by an auto-verification process reaches a predetermined number. The auto-verification process will be described later with reference to FIG. 12.

Figure 6A:
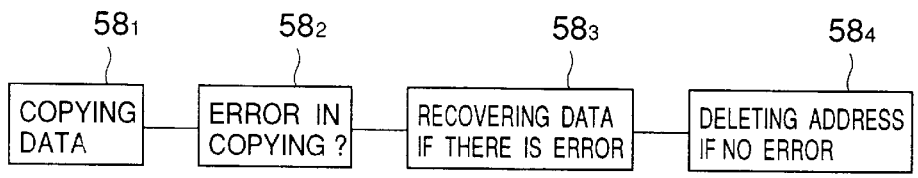
FIGS. 6A through 6D are block diagrams of units which form the automatic-replacement processing unit.

FIG. 6A shows a block diagram of a process of the data copying unit 58. At $58_1$, data to be recovered is copied from a defective sector to a temporary replacing sector $38_{a2}$ of the SA area 38a. At $58_2$, a check is made as to whether the defective sector recorded in the R stack generates an error again during the copying process. At $58_3$, if an error is generated at $58_2$, data recovery is attempted through the offset read or the ECC correction. At $58_4$, an address of the sector recorded in the R stack is deleted if there is no error during the copying process.

The data recovered through the data recovery is copied to the replacing sector. On the other hand, the data which is not recovered through the data recovery is copied to the temporary replacing sector as uncorrectable data which shows unmatched ECC. After the above processes, data is written in or read from the temporary replacing sector when the host computer 22 issues the read/write instruction. Here, the same data is copied to a plurality of the blocks in case a power cut occurs during the copying process, and each of the copied data is provided with a time stamp at the beginning thereof.

Figure 6B:
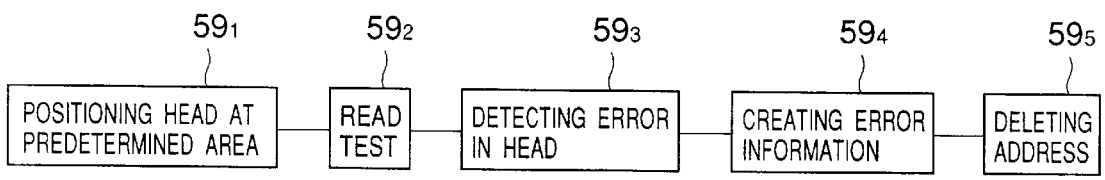

FIG. 6B shows a block diagram of a process of the W/R testing unit 59. At $59_1$, the R/W head 33 is positioned in an area where it is confirmed in advance that the area is defect free. At $59_2$, a read test is conducted. At $59_3$, if correct data cannot be read during the read test, it is determined that the R/W head is the cause of the error. At $59_4$, error information is created before the process is terminated. At $59_5$, the address of the defective sector recorded in the R stack is deleted.

Figure 6C:
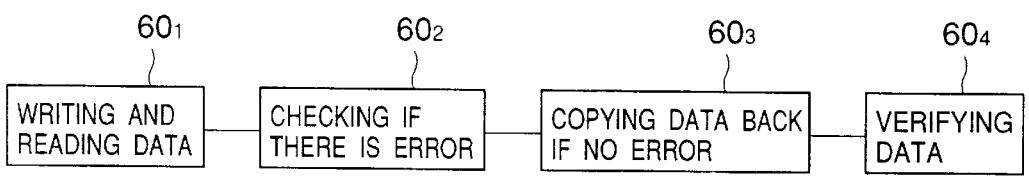

FIG. 6C shows a block diagram of a process of the defective-sector testing unit 60. At $60_1$, data is written in and read from the sector which has generated the error, in order to determine whether this sector is really defective. At $60_2$, a check is made to determine if the data can be written and read without an error. At $60_3$, if the data is written and read without an error, the data written in the temporary replacing sector is copied back to this sector. At $60_4$, it is confirmed that the same data is stored in this sector and the temporary replacing sector, before the process ends.

Figure 6D:
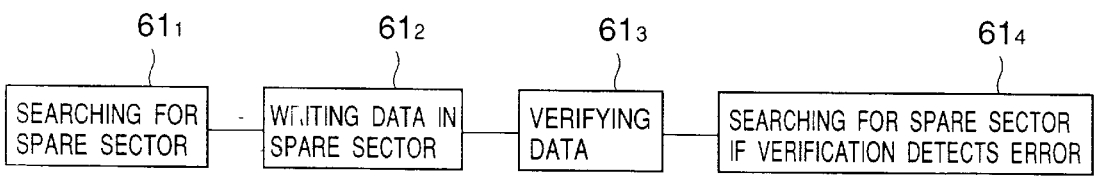

FIG. 6D shows a block diagram of a process of the replacement block unit 61. The replacement block unit 61 is activated when the writing and reading of the data by the defective-sector testing unit 60 fails during the test of the defective sectors. At $61_1$, a search is made for an available spare sector. At $61_2$, the data of the temporary replacing sector is written in the spare sector. At $61_3$, it is verified that the data is written in the spare sector without an error. At $61_4$, if an error is detected, a search is made for another spare sector, and the same procedure is repeated.

Figure 7A:
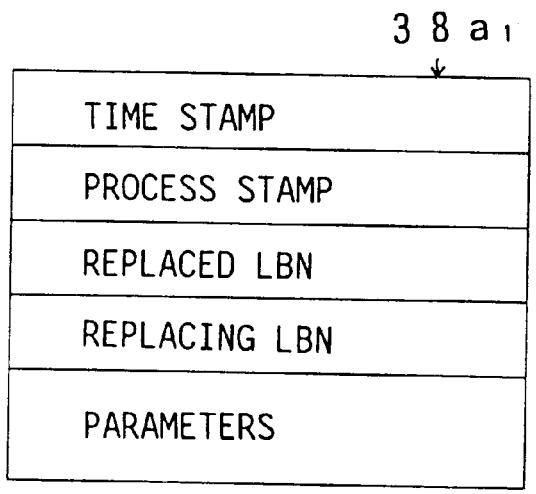
FIGS. 7A through 7C are illustrative drawings for explaining an SA area on a magnetic disk of FIG. 4.
Figure 7B:
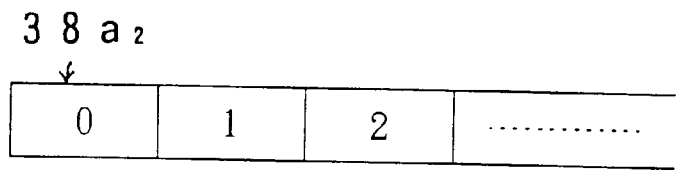
Figure 7C:
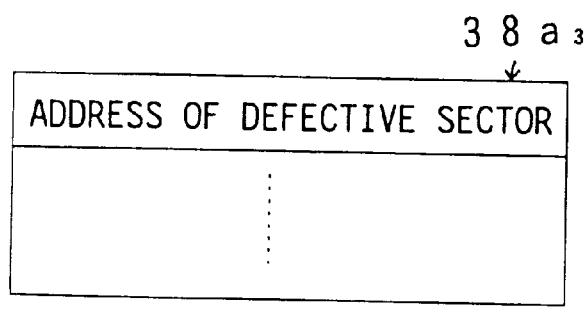

FIG. 7A, 7B and 7C show a configuration of the SA area 38a. FIG. 7A shows the sequence table $38a_1$ of the SA area 38a, which contains a time stamp, a process stamp indicating that the process is underway, a replaced LBN (logical block number), a replacing LBN, and other parameters.

FIG. 7B shows temporary replacing sectors $38a_2$, in which data of sectors having generated errors is written. As mentioned before, the same data is recorded in a plurality of blocks in case a power cut should occur during the copying process.

FIG. 7C shows the R stack $38a_3$ which serves as address memory means for recording addresses of defective sectors. The R stack is not necessarily located in the SA area 38a, but can be provided in the RAM 30.

In this embodiment, the SA area 38a is provided on the magnetic disk 38. However, $E^2$PROM (electrically erasable programmable ROM) may be provided in the HDC 25, and the SA area 38a may be implemented in the $E^2$PROM.

Figure 8A:
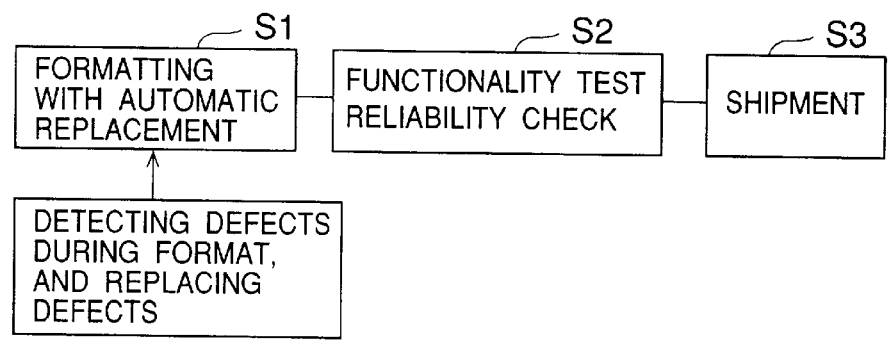
FIGS. 8A and 8B are flowcharts of the entire testing process and an automatic replacement process, respectively, according to the embodiment of the present invention.
Figure 8B:
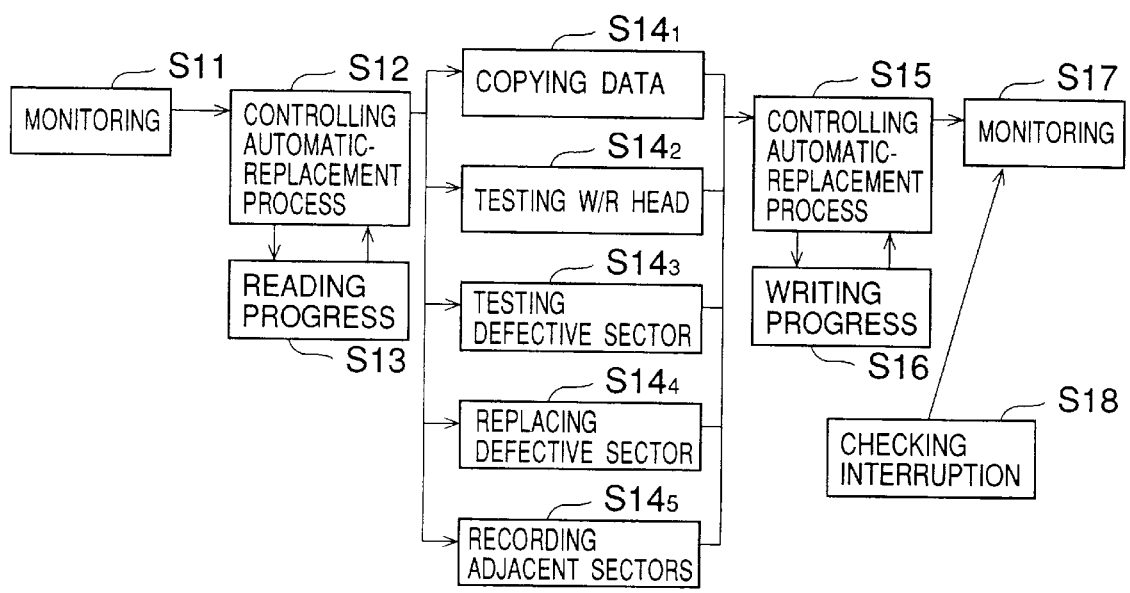

FIGS. 8A and 8B show flowcharts of the entire testing process and the automatic replacement process, respectively.

FIG. 8A shows a flowchart of the entire testing process according to the present invention. At a step S1, the automatic replacement process is conducted by detecting defective sectors during the formatting of the magnetic disk 38 before shipment of the device from the factory. The defective sectors detected by this process are those which are not recoverable, and, the ECC correction, the retry, and the format/certify process are used for detecting the defective sectors. At a step S2, the functionality test and the reliability check are conducted. At a step S3, the device is shipped from the factory. As noted before, only unrecoverable defective sectors are replaced before the shipment, and small defects will be treated after the shipment.

FIG. 8B shows a brief flowchart of the automatic replacement process. At a step S11, the monitoring unit 51 carries out program monitoring. At a step S12, one process of the automatic replacement process is started under the control of the automatic replacement unit 54. Here, the progress reading unit 57 reads a progress of the replacement process from the magnetic disk 38 (the SA area 38a) at a step S13.

Depending on the progress of the automatic replacement process, one of the processes of steps $S14_1$, $S14_2$, $S14_3$, $S14_4$, and $S14_5$ is conducted with regard to defective sectors, which are detected by the drive control unit 53 during the reading test. At the step $S14_1$, the data copying unit 58 copies data from the defective sectors to the temporary replacing sectors. At the step $S14_2$, the W/R testing unit 59 tests the W/R head by data writing and data reading. At the step $S14_3$, the defective-sector testing unit 60 checks whether the defective sectors are really defective. At the step $S14_4$, the replacement block unit 61 selects the replacing blocks and writes the data in the replacing blocks. At the step $S14_5$, the adjacent-sector recording unit 62, if provided, records the adjacent sectors abutting the defective sectors in the SA area 38a in accordance with instructions given by the automatic replacement unit 54.

At a step S15, one of the processes of the steps $S14_1$ through $S14_5$ is finished under the control of the automatic replacement unit 54. At a step S16, the progress writing unit 56 writes the progress of the replacement process in the SA area 38a (the sequence table $38a_1$). At a step S17, the monitoring unit 51 starts monitoring conditions by using the program monitor. At a step S18, a check is made whether there is an interruption from the host computer 22. While making the check, a next process of the automatic replacement process is carried out under the control of the automatic replacement unit 54. If there is an interruption, the automatic replacement process is conducted accordingly, depending on the progress of the replacement process. This will be described later.

In the following, the replacement process will be described in detail by starting from a point where the magnetic disk drive 21 is powered on.

Figure 9:
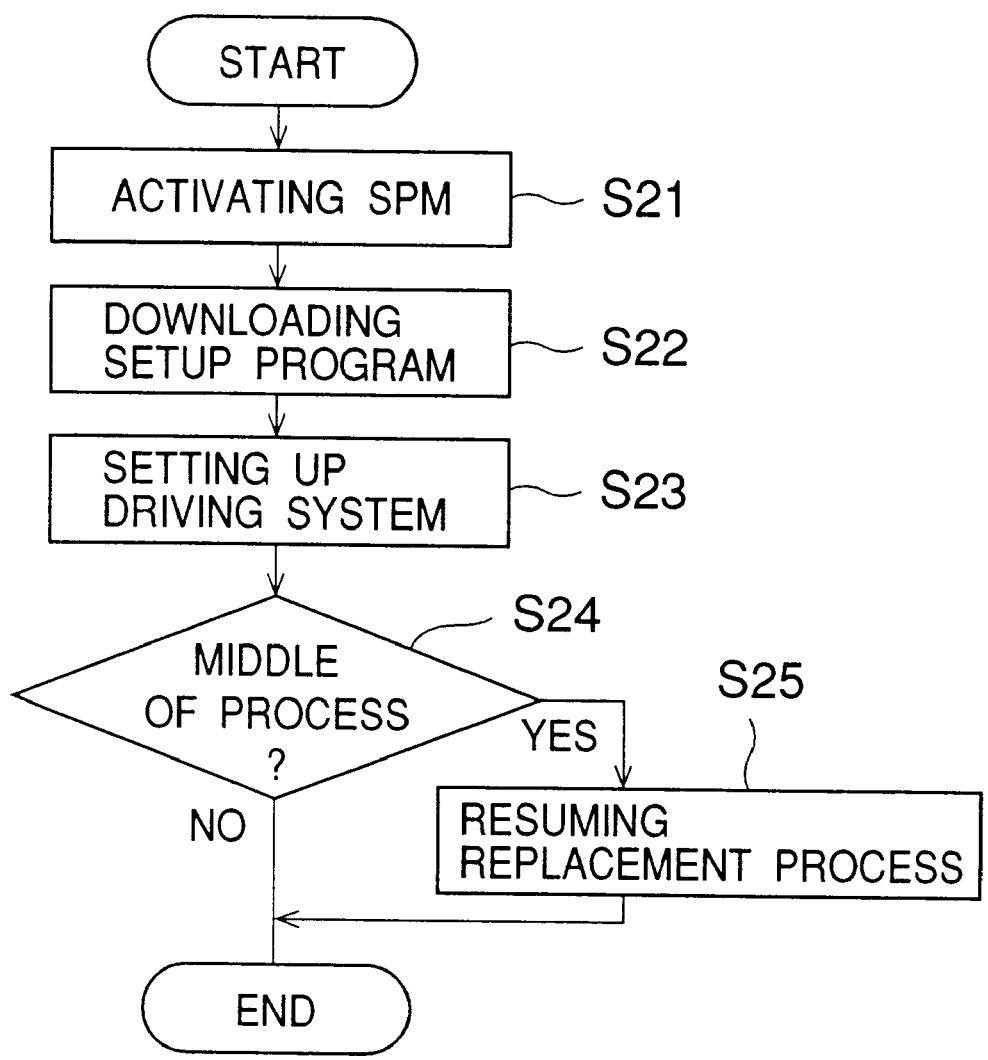
FIG. 9 is a flowchart of a process which is carried out after power on or resetting of the magnetic disk drive.

FIG. 9 shows a flowchart of a process carried out after the power on or the resetting of the magnetic disk drive 21. At a step S21, the SPM 27 is activated to rotate the magnetic disk 38 when the magnetic disk drive 21 is powered on. When the magnetic disk drive 21 is reset, the SPM 27 is in operation so that the step S21 is skipped. At a step S22, a setup program is downloaded. At a step S23, all the driving systems are set up.

At a step S24, a check is made whether the replacement process was underway last time when the magnetic disk drive 21 was turned off. The check is made based on the progress which is read from the SA area 38a of the magnetic disk 38 by the progress reading unit 57. If the replacement process was underway, the procedure goes to a step S25, otherwise the procedure ends. At a step S25, the replacement procedure is resumed and completed. This ends the procedure for the start up of the magnetic disk drive 21.

FIGS. 10A through 10E collectively show a flowchart of the replacement process in detail.

Figure 10A:
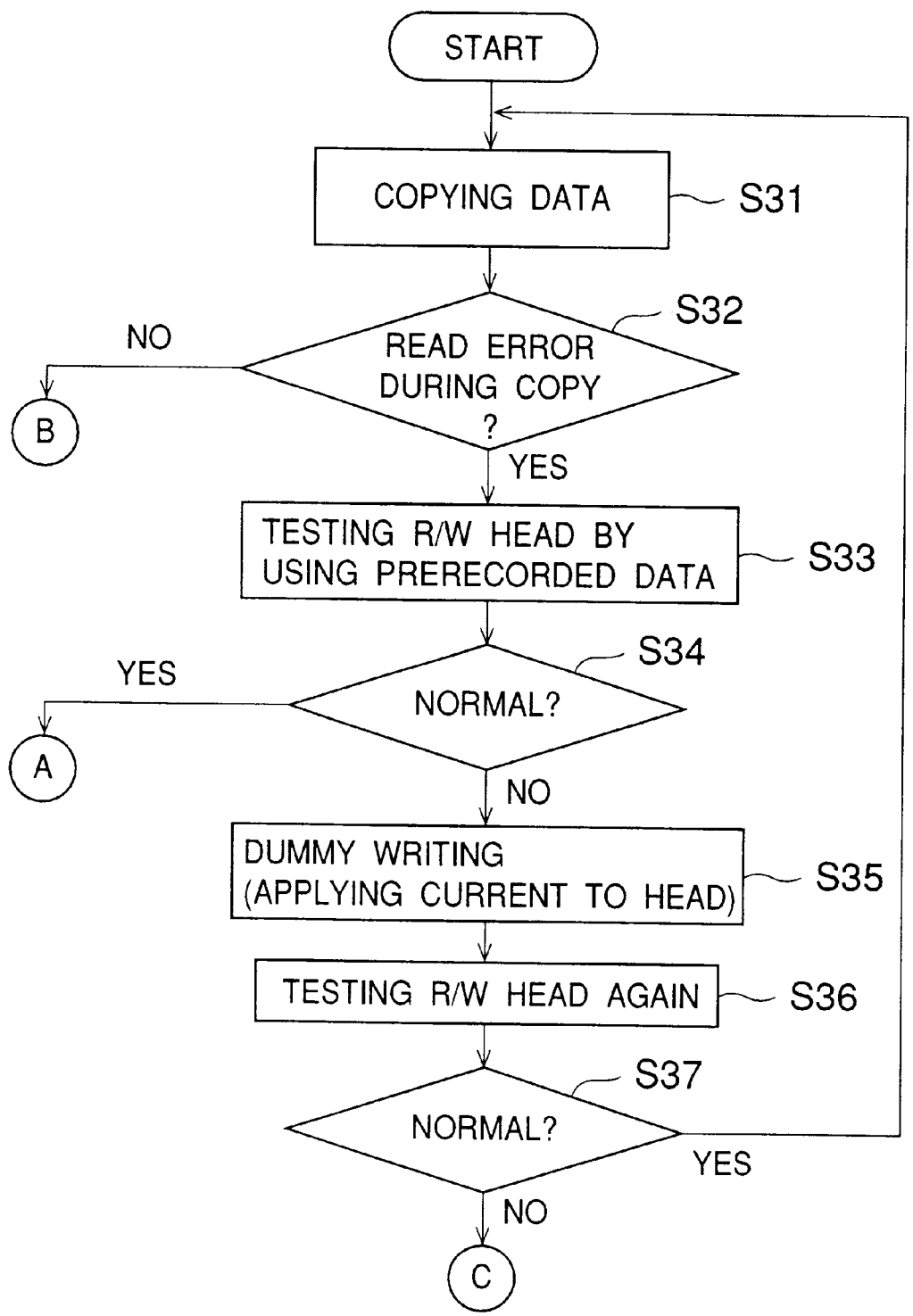
FIGS. 10A through 10E are flowcharts of the automatic-replacement process.

In FIG. 10A, first, the automatic replacement process is started when a defective sector recorded in the R stack is detected by an auto-verification process. At a step S31, data recorded in a defective sector is copied to a plurality of blocks of a temporary replacing sector $38a_2$ in the SA area 38a. The data recorded in the defective sector is attempted to be recovered through the offset retry and the ECC correction. Even if the data is not recovered, it is copied as uncorrectable data with a time stamp attached to the beginning of the data.

At a step S32, a check is made whether the defective sector has generated an error during the copying of the data. If there is no error, the procedure goes to a point of the flowchart denoted as (B). If there is an error, the procedure goes to a step S33. At the step S33, the head test for checking the R/W head 33 is conducted. A predetermined cylinder is used for the head test, which is provided for a maintenance purpose, and for which it is assured that prerecorded data (the worst data) can be positively read.

At a step S34, a check is made based on the head test whether the R/W head 33 is functioning normally. If it is, the procedure goes to a point of the flowchart denoted as (A). If the R/W head 33 is not functioning normally, the procedure goes to a step S35. At the step S35, dummy data is written in the predetermined cylinder. At a step S36, the head test is conducted again by reading the dummy data. Here, a dummy current or a recording current may be applied to the R/W head 33 without recording the dummy data. In this case, the worst data on the predetermined cylinder is read. At a step S37, a check is made whether the R/W head 33 is defective. If it is not defective, the procedure goes back to the step S31. If the R/W head 33 is defective, the procedure goes to a point of the flowchart denoted as (C). Conducting the head test as describe above can prevent a meaningless replacement of sectors.

Figure 10B:
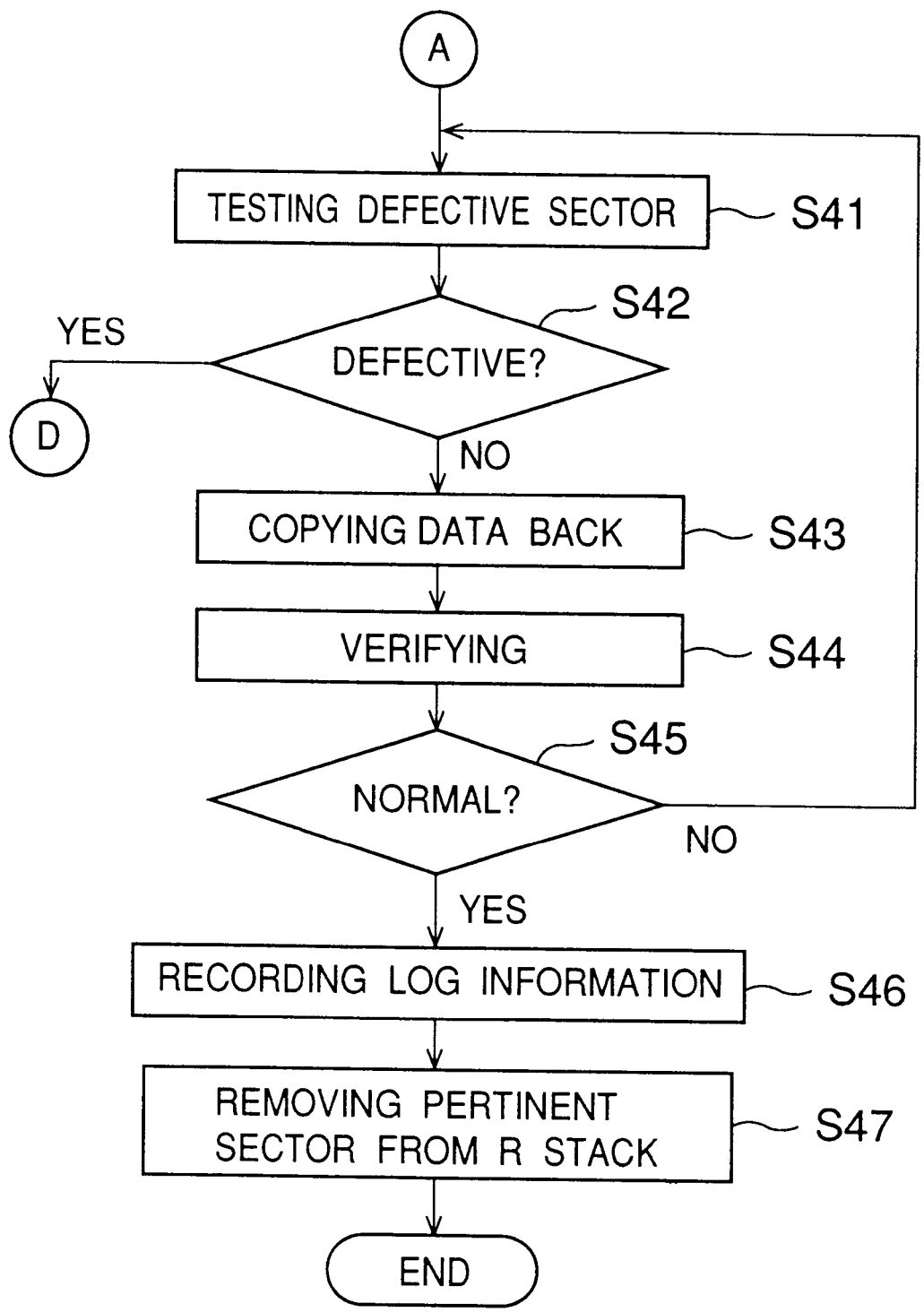

If it turns out at the step S34 that the R/W head 33 is functioning normally, the procedure goes to a step S41 of FIG. 10B. At the step S41, a test of the defective sector is conducted again by reading data after rewriting an ID portion and a data portion of the defective sector. At a step S42, a check is made based on the test whether the defective sector is really defective. If it is, the procedure goes to a point of the flowchart denoted as (D). If the defective sector turns out to be not defective, the procedure goes to a step S43. At the step S43, data of an ID portion and a data portion of the temporary replacing sector $38a_2$ is copied back to the sector which turned out to be not defective. At a step S44, it is verified that the data copied back to this sector is recorded normally. This verification is not conducted if the data copied back from the temporary replacing sector $38a_2$ is uncorrectable data.

At a step S45, a check is made whether an abnormality is detected by the verification. If it is, the procedure goes back to the step S41, otherwise the procedure goes to a step S46. At the step S46, LOG (logical) information showing error statistics is recorded in the SA area 38a. At a step S47, the address of the sector which turns out to be not defective is deleted from the R stack. This ends the procedure.

Figure 10C:
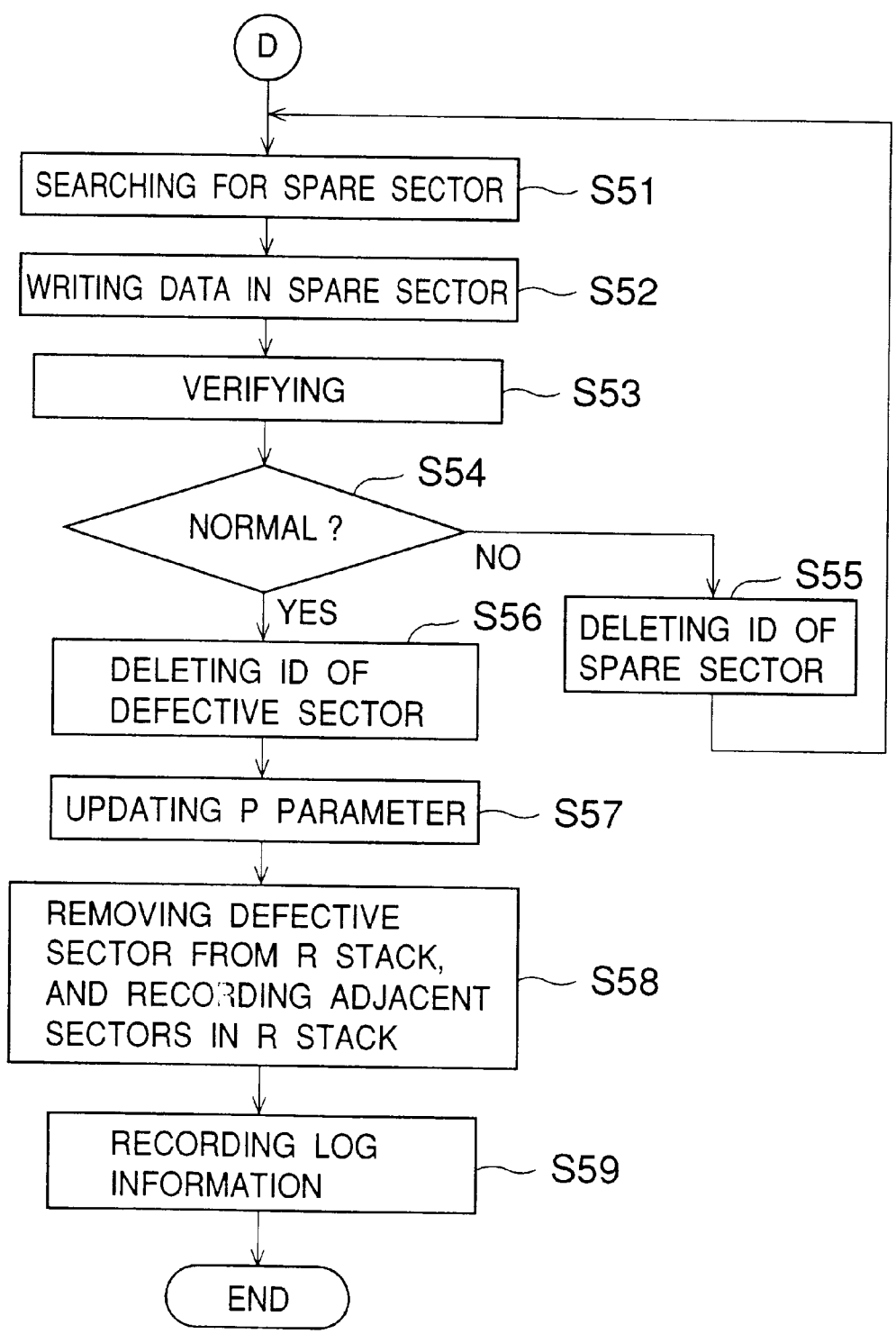

If it turns out at the step S42 that the defective sector is really defective, the procedure goes to a step S51 of FIG. 10C. At the step S51, an available spare sector is searched. At a step S52, the data in the temporary replacing sector $38a_2$ is written in an ID portion and a data portion of the spare sector. At a step S53, it is verified that the data is written in the spare sector normally. At a step S54, a check is made whether an abnormality is reported by the verification. If there is an abnormality, the procedure goes to a step S55, where the ID portion of the spare sector is deleted. Then, the procedure goes back to the step S51. If there is no abnormality reported by the verification, the procedure goes to a step S56. At the step S56, the ID portion of the defective sector is deleted. At a step S57, a P parameter indicating an address of a track for which the replacement process is finished is updated in the sequence table $38a_1$ of the SA area 38a.

At a step S58, the defective sector is deleted from the R stack, and four adjacent sectors adjoining the defective sectors are recorded in the R stack. At a step S59, LOG information is recorded in the SA area 38a. This ends the procedure of the replacement process.

Figure 10D:
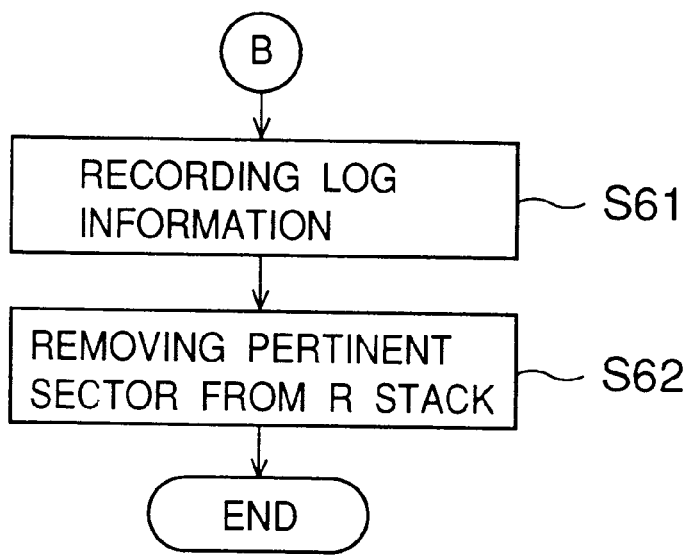

If it turns out at the step S32 of FIG. 10A that no error is detected during the copying of the data, the procedure goes to a step S61 of FIG. 10D. In this case, it is deemed that there is no need for replacing sectors because a detected read error is due to noise or the like. Thus, at a step S61, the LOG information is recorded in the SA area 38a. At a step S62, the address of the sector which has initially reported an error due to noise or the like is deleted from the R stack. This ends the procedure.

Figure 10E:
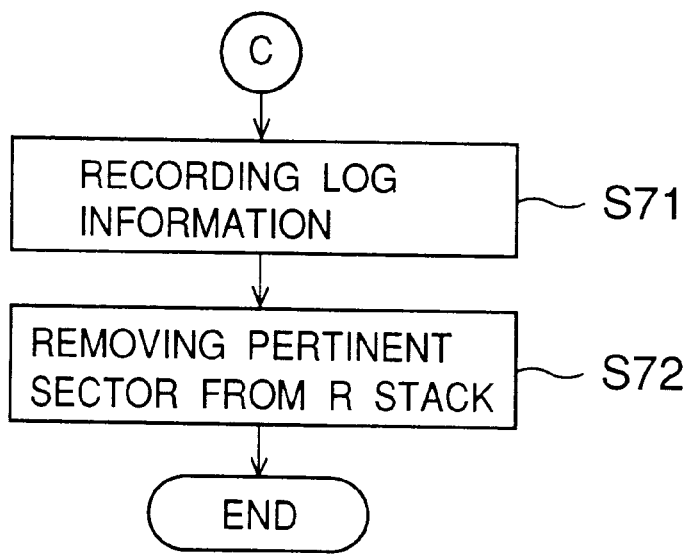

Also, if it turns out at the step S37 of FIG. 10A that the R/W head is malfunctioning, the procedure goes to a step S71 of FIG. 10E. At a step S71, the LOG information is recorded in the SA area 38a. At a step S72, the address of the defective sector is deleted from the R stack. This ends the procedure.

During the procedure of FIGS. 10A through 10E, the sequence table $38a_1$ is updated at each end of the steps S31, S33, S35, S36, S41, S43, S44, S46, S51, S52, S53, S55, S56, S57, S58, S59, S61, and S71. This can avoid a duplication of the replacement process and the loss of data which would otherwise be caused by power cut or a reset during the replacement process.

Figure 11:
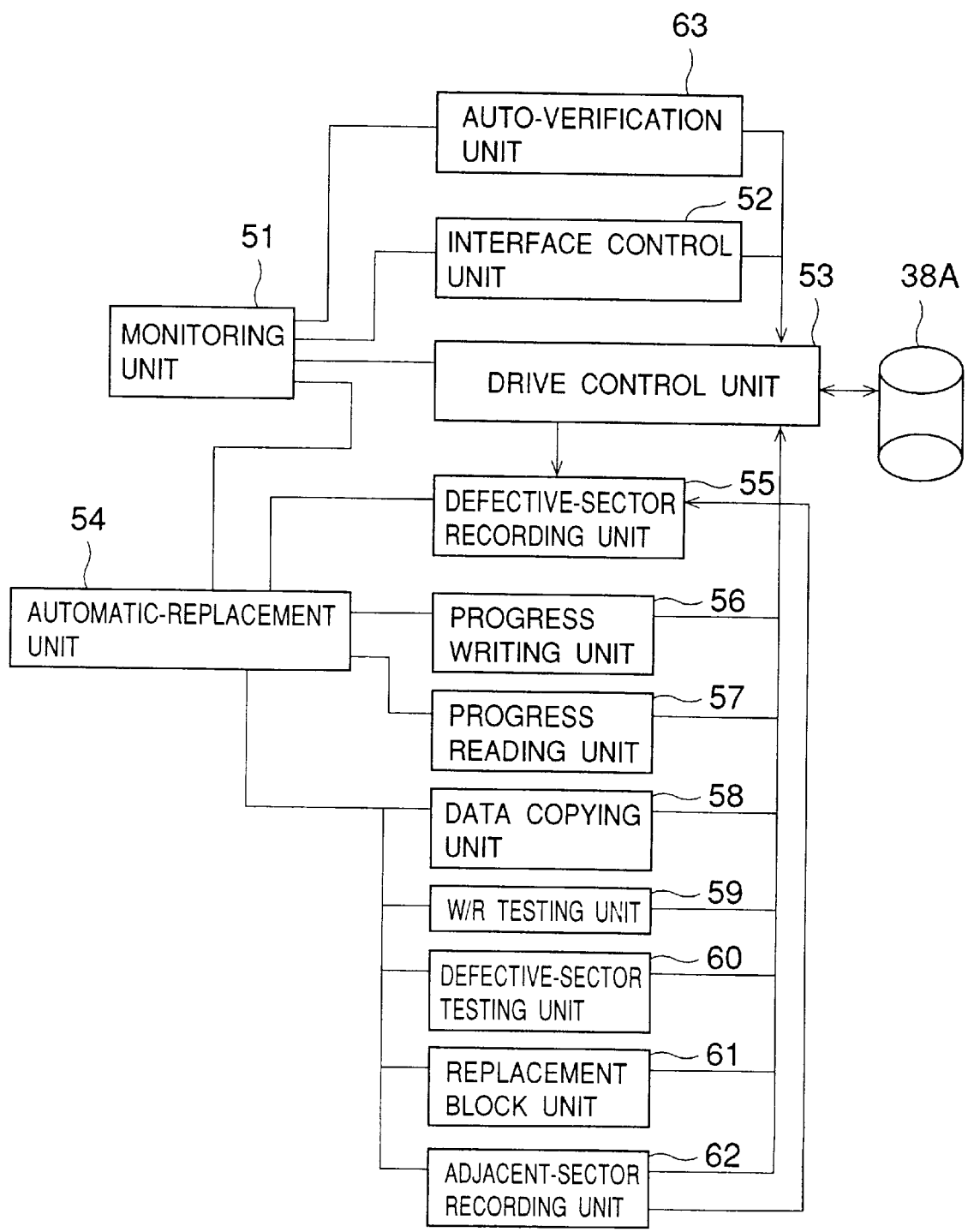
FIG. 11 is a block diagram of a variation of the control monitoring unit and the automatic-replacement processing unit of FIG. 3.

FIG. 11 shows a block diagram of the control monitoring unit 26 and the automatic-replacement processing unit 27 of FIG. 3. FIG. 11 is a variation of the configuration shown in FIG. 5. In FIG. 11, an auto-verification unit 63 and the adjacent-sector recording unit 62 are provided in addition to the elements of FIG. 5. In FIG. 11, the same elements as those of FIG. 5 are referred to by the same numerals, and a description thereof will be omitted.

The auto-verification unit 63 reads the entire surface of the magnetic disk 38 at a predetermined time. For example, if no access is attempted by the host computer 22 for three seconds, the auto-verification unit 63 conducts a media test track by track. The verification (the media test) is conducted sequentially. In order to avoid a duplication of the test on the same track each time the power is turned on, addresses of tracks for which the verification is finished are stored in the P parameter of the SA area 38a. This verification detects sectors with read errors, and records these sectors in the R stack.

For a verification purpose, a read-test pattern which is as difficult to read as possible is preferably recorded in unused sectors. Thus, this read-test pattern is preferably recorded in data portions during the formatting of the disk. The read-test pattern can also be used for a media inspection.

Figure 12:
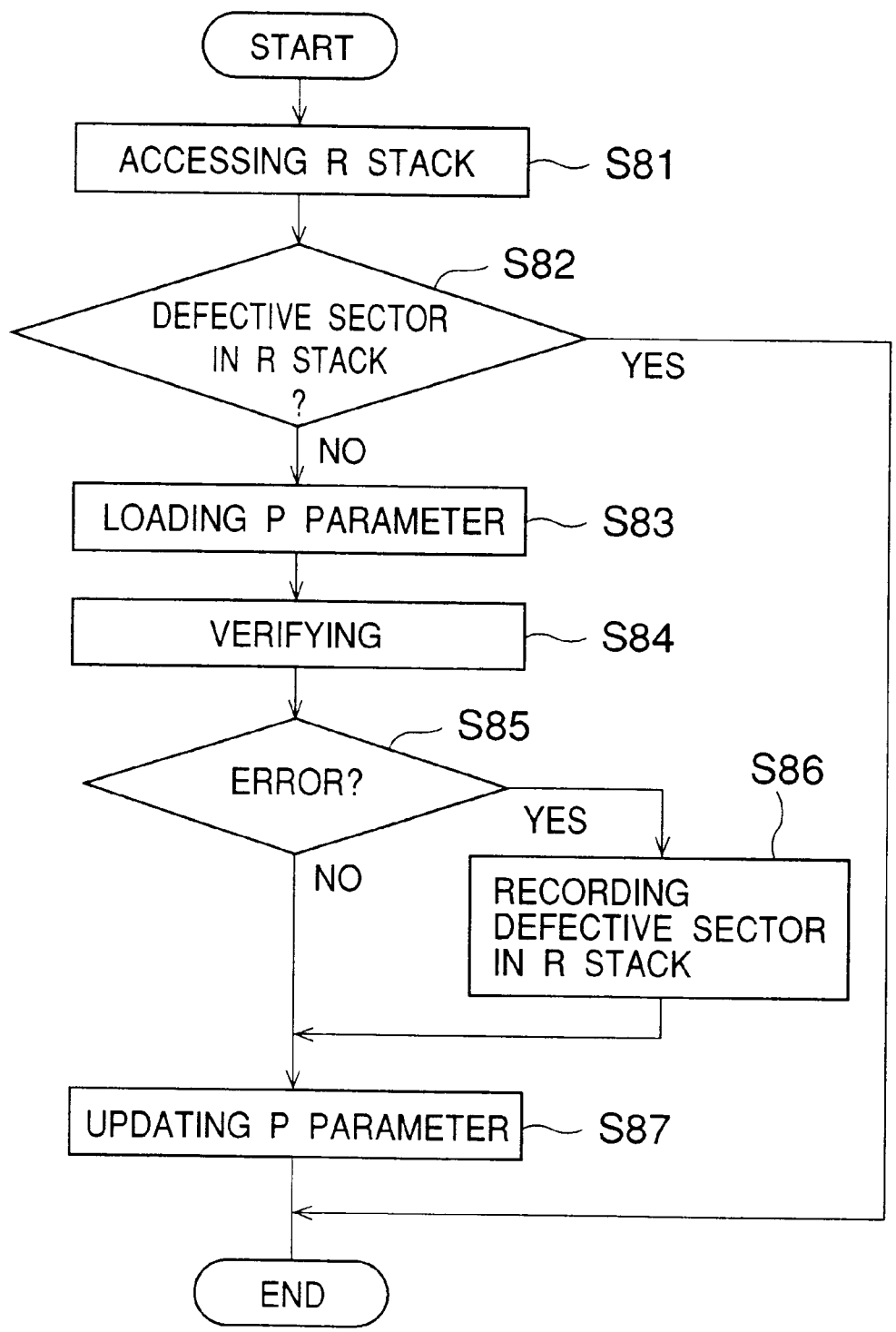
FIG. 12 is a flowchart of a process of an auto-verification unit of FIG. 11.

FIG. 12 shows a flowchart of a process of the auto-verification unit 63. In FIG. 12, the auto-verification process may start, for example, when there is no access from the host computer 22 for three seconds.

At a step S81, the R stack in the SA area 38a is accessed. At a step S82, a check is made whether defective sectors are recorded in the R stack. If they are, the procedure ends, which initiates the automatic replacement process of FIG. 10A through FIG. 10E. If there is no defective sector in the R stack, the procedure goes to a step S83. At the step S83, the P parameter of the sequence table $38a_1$ in the SA area 38a is loaded. At a step S84, the R/W head 33 goes to a track to be verified, and a read test (verification) is conducted for the track. At a step S85, a check is made whether there are read errors. If there are read errors, sectors with the read errors are recorded in the R stack at a step S86 by writing the LBN of the sector address. Then, the procedure goes to a step S87.

If it turns out at the step S85 that there is no error detected by the verification, the procedure goes to the step S87 also. At the step S87, the P parameter is updated. Here, the update of the P parameter does not change the track format.

The auto-verification process as described above checks at a predetermined time if there is a defective sector recorded in the R stack. If there is a defective sector, the automatic replacement process of FIGS. 10A through 10E are activated to replace the sectors. The automatic replacement process may be initiated when there are a predetermined number of defective sectors recorded in the R stack.

The recording media is tested regularly as described above, so that sectors generating read errors can be repaired or replaced at an early stage before causing errors for the reading or the writing of real data. Thus, damage caused by read errors can be prevented beforehand so as to enhance the reliability of the recording/reproducing of data.

Figure 13:
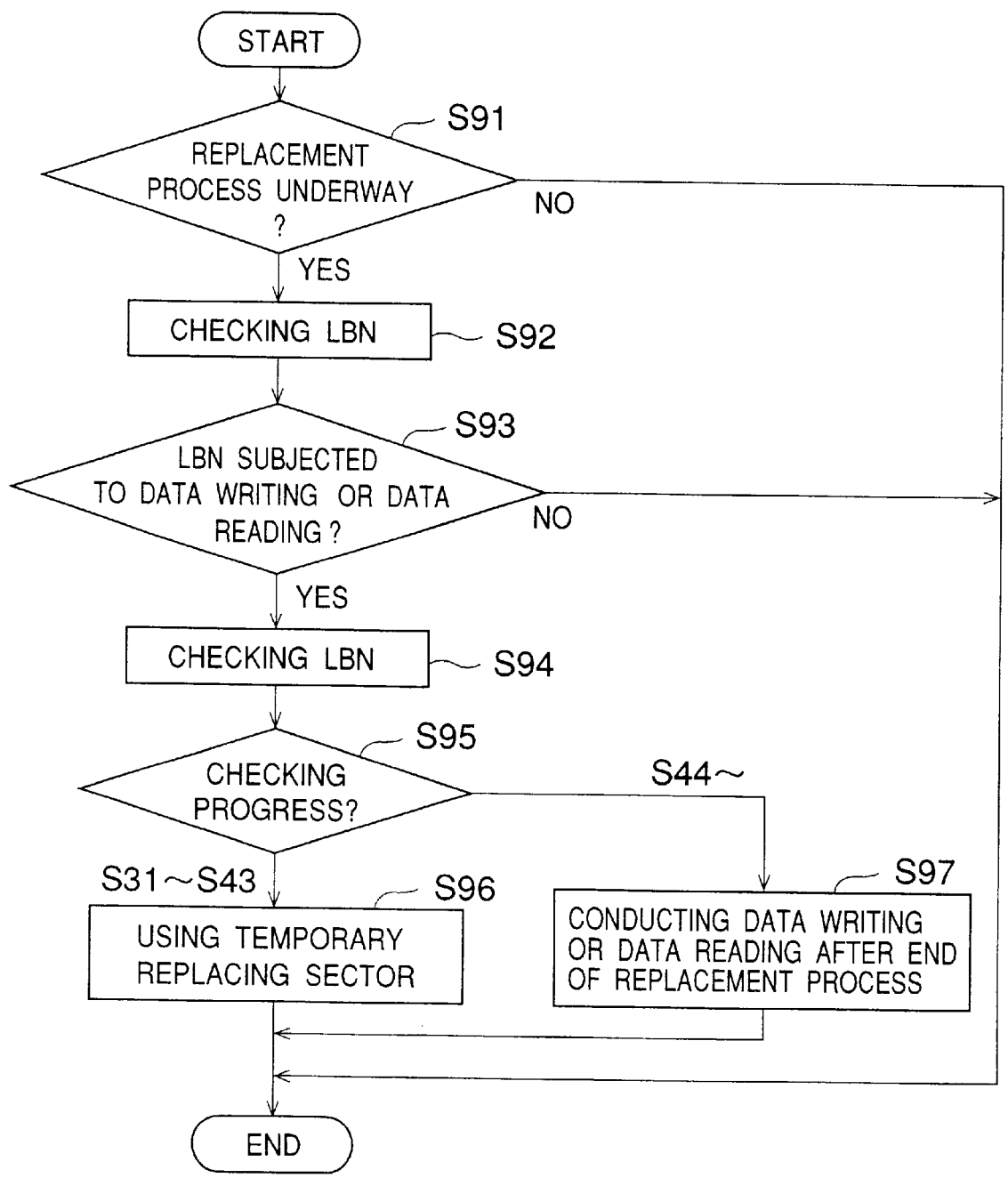
FIG. 13 is a flowchart of a process which is concerned with the control of an interface with the host computer 22 of FIG. 3.

FIG. 13 shows a flowchart of a process which is concerned with the control of an interface with the host computer 22. In FIG. 13, it is assumed that there is a need for controlling the interface because an instruction (e.g., a write instruction) is sent from the host computer 22.

At a step S91, a check is made whether the replacement process is underway. If it is not, the procedure ends. If the replacement process is underway, the interface has to be controlled.

At a step S92, the LBN being processed is checked. At a step S93, a check is made to see if this LBN is one of the blocks which are subjected to data writing or data reading by the instruction from the host computer 22. If it is not, the procedure ends. In this case, data writing or data reading for other blocks is carried out by interrupting the replacement process.

If the LBN is one of these blocks, the procedure goes to a step S94, where the LBN being processed is checked. At a step S95, a check is made with regard to the progress of the replacement process. If the replacement process is on the way from the step S31 of FIG. 10A to the step S43 of FIG. 10B, the procedure goes to a step S96. At the step S96, the temporary replacing sector $38a_2$ is used for the data writing or the data reading by the instruction while the replacement process is interrupted. If it turns out at the step S95 that the replacement process is on the way from the step S44 to the later steps, the procedure goes to a step S97. At the step S97, the data writing or the data reading by the instruction is conducted after the replacement process is finished.

In this manner, the replacement process can be carried out without interfering with the interface control. Also, it should be noted that areas not accessed by the interface can be checked for defects independently of the interface.

In this manner, only true defects of the media are selected and replaced, so that a meaningless replacement of sectors can be avoided. Thus, shortening of the life and reduction of the performance of the device is prevented. Also, since the replacement process is divided into steps and the progress is recorded for each of the steps, the replacement process can be continued even after a power interruption has been restored and the like. Further, user data is temporarily stored in the temporary replacing sector during the replacement process, so that the loss of data can be avoided to enhance the reliability of the process.

Also, areas are tested for defects even if the areas are not accessed by the host computer. This reduces a possibility that fatal errors occur in sectors which are used for the first time. Furthermore, adjacent sectors in the same track or in the abutting tracks are tested for the defect so that an error detectability can be enhanced.

Also, the replacement process is conducted independently of the interface control, and is divided into small steps between which the replacement process can be stopped. This prevents a problem such as a timeout.

Thus, even if the test time before the shipment of the device is shortened, the automatic replacement process used in combination with the ECC function and the offset-read function provides an effective media test in the field after the shipment. Thus, the reliability of the device is enhanced while the test time is significantly reduced.

According to the present invention, after defective sectors are detected, data of the defective sectors is copied to temporary replacing sectors. Then, the defective sectors are checked by the read/write test if they are really defective. After the confirmation of the defectiveness of the defective sectors, data in the temporary replacing sectors are copied to spare sectors, while the progress of the replacement process is recorded. Thus, the present invention provides an effective field test while enabling the test time before the shipment of the device to be shortened. Also, since the inappropriate replacement of sectors is prevented, reductions in the life and performance of the device are prevented. Furthermore, the loss of data during the replacement process can be prevented, so that the reliability of the device is enhanced.

Also, according to the present invention, the adjacent sectors adjoining a defective sector in the same track as well as in abutting tracks are recorded for a later check. Thus, the detectability of defective sectors is enhanced.

Also, according to the present invention, the repeatability of read errors is tested after copying the data of the defective sectors to the temporary replacing sectors. Thus, protection of the data is ensured while the inappropriate replacement process is prevented from being applied to non-defective sectors.

Furthermore, according to the present invention, the head used in detecting read errors is tested by using the head for reading test data or for writing the dummy data. Thus, the inappropriate replacement of sectors is prevented.

Also, according to the present invention, the replacement process is divided into small steps, which are carried out one by one with the progress of the replacement process being recorded for each of the steps. Thus, the replacement process can be resumed where it is stopped.

Furthermore, according to the present invention, the replacement process is carried out without interfering with the control of the interface of the host device. Since the replacement process can be stopped and resumed, the problem of timeout is prevented. Thus, the present invention can be reliably applied to a disk drive with a small-size disk.

Also, according to the present invention, auto-verification is conducted at a predetermined time to record addresses of the defective sectors. Thus, areas are tested for media defects even if the areas are not accessed by the host device. Thus, a possibility of encountering errors in first-used sectors is reduced, and the replacement process is made more effective.

Further, the present invention is not limited to these embodiments, but various variations and modifications may be made without departing from the scope of the present invention.

What is claimed is:

1. A device for recording and reproducing data to and from recording media, said device comprising:

error detecting means for detecting an error in sectors of the media by reading data from the media;

data copying means for applying data correction to data of a sector suffering the error to generate recovered data and for writing in at least one temporary replacing sector said recovered data when said data of said sector is correctable and said data of said sector when said data of said sector is uncorrectable, said at least one temporary replacing sector being provided on the media;

test means for testing whether said sector has a media defect;

replacement means for copying data of said at least one temporary replacing sector to a spare sector when said test means detects said media defect in said sector, and back to said sector when said test means does not detect said media defect in said sector;

progress writing means for recording progress of operations of said data copying means, said test means, and said replacement means by writing the progress of operations step-by-step in the media; and interface control means for controlling an interface with a host which is connected to said device such that said operations proceed independently of said host.

2. The device as claimed in claim 1, further comprising a plurality of temporary replacing sectors, and wherein said data of said sector in which said error is detected is copied to each of said plurality of said temporary replacing sectors.

3. The device as claimed in claim 1, wherein said test means comprises head testing means for testing a head, said head being when said error detecting means detects said sector in which said error has been detected.

4. The device as claimed in claim 3, wherein said head testing means comprises means for reading test data prerecorded in a predetermined position of said media and for checking whether a read error is detected during the reading of said test data.

5. The device as claimed in claim 3, wherein said head testing means comprises dummy testing means for conducting a dummy-write process to check said head.

6. The device as claimed in claim 5, wherein said dummy testing means comprises means for applying an electric current to said head, for reading a test data prerecorded in a predetermined position of said media, and for checking whether a read error is detected during said reading of said test data.

7. The device as claimed in claim 1, further comprising progress reading means for reading said progress, so that said processes can be resumed based on said progress where said processes are stopped.

8. The device as claimed in claim 1, further comprising memory means for recording an address of said sector in which said error has been detected when said error detecting means detects said sector in which said error has been detected.

9. The device as claimed in claim 8, further comprising adjacent-sector recording means for recording addresses of adjacent sectors in said memory means, said adjacent sectors adjoining said sector in which said error has been detected in the same track or in abutting tracks.

10. A method of replacing a defective sector with a spare sector on media, said method comprising the steps of;

a) detecting an error in sectors of the media by reading data from the media;

b) applying data correction to data of a sector suffering said error to generate recovered data and for writing in at least one temporary replacing sector said recovered data when said data of said sector is correctable and said data of said sector when said data of said sector is uncorrectable, said at least one temporary replacing sector being provided on the media;

c) testing whether said sector has a media defect;

d) copying data of said at least one temporary replacing sector to a spare sector when said sector has said media defect, and back to said sector when said sector does not have said media defect;

e) recording progress of operations of the steps b), c) and d) by writing the progress of operations step-by-step in the media; and f) controlling an interface with a host which records and reproduces data to and from the media such that said operations proceed independently of said host.

11. The method as claimed in claim 10, further comprising, between said step b) and said step c), a step of testing a head, said head being used when said error detecting means detects said sector in which said error is detected.

12. The method as claimed in claim 10, wherein said step a) is performed at a predetermined time.

13. The method as claimed in claim 10, wherein said step a) further comprising a step of recording an address of said sector in which said error has been detected in a memory.

14. The method as claimed in claim 13, wherein said step b) copies said data of said sector in which said error has been detected to at least one temporary replacing sector when a predetermined number of sectors in which said error has been detected exist in said memory.

* * * * *

UNITED STATES PATENT AND TRADEMARK OFFICE
CERTIFICATE OF CORRECTION

PATENT NO. : 6,043,945
DATED : March 28, 2000
INVENTOR(S) : Tsuboi et al.

It is certified that error appears in the above-indentified patent and that said Letters Patent is hereby corrected as shown below:

On the title page:

Under "[56] References Cited, FOREIGN PATENT DOCUMENTS" please delete "4106744 4/1992 Japan" and insert --4106764 4/1992 Japan-- therefor Column 13, line 19, after "being" insert --used--

Signed and Sealed this

Seventeenth Day of April, 2001

Attest:

NICHOLAS P. GODICI

*Attesting Officer*  *Acting Director of the United States Patent and Trademark Office*